(12) United States Patent
Chang

(10) Patent No.: US 11,368,632 B2
(45) Date of Patent: Jun. 21, 2022

(54) METHOD AND APPARATUS FOR PROCESSING VIDEO, AND STORAGE MEDIUM

(71) Applicant: Beijing Xiaomi Pinecone Electronics Co., Ltd., Beijing (CN)

(72) Inventor: Binglin Chang, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 0 days.

(21) Appl. No.: 17/025,429

(22) Filed: Sep. 18, 2020

(65) Prior Publication Data

US 2021/0337136 A1  Oct. 28, 2021

(30) Foreign Application Priority Data

Apr. 27, 2020 (CN) .......................... 202010345830.3

(51) Int. Cl.
*H04N 5/265* (2006.01)
*G06T 7/33* (2017.01)
(Continued)

(52) U.S. Cl.
CPC ............. *H04N 5/265* (2013.01); *G06T 7/337* (2017.01); *G06V 20/46* (2022.01); *G11B 27/036* (2013.01);
(Continued)

(58) Field of Classification Search
CPC ........ H04N 5/265; H04N 7/013; G11B 27/06; G11B 27/036; G06T 7/337; G06T 2207/10016; G06K 9/00744
See application file for complete search history.

(56) References Cited

U.S. PATENT DOCUMENTS

2009/0208062 A1* 8/2009 Sorek ................. H04N 5/23229
382/107
2014/0240551 A1 8/2014 Kim et al.
(Continued)

FOREIGN PATENT DOCUMENTS

CN 105450946 A 3/2016
CN 108259781 A 7/2018
(Continued)

OTHER PUBLICATIONS

Shah Rajvi et al: "Interactive Video Manipulation Using Object Trajectories and Scene Backgrounds", IEEE Transactions On Circuits and Systems for Video Technology, vol. 23, No. 9, Sep. 2013, pp. 1565-1576.
(Continued)

*Primary Examiner* — Girumsew Wendmagegn
(74) *Attorney, Agent, or Firm* — Finnegan, Henderson, Farabow, Garrett & Dunner, L.L.P.

(57) ABSTRACT

A method for processing a video includes: identifying a target object in a first video segment; acquiring a current video frame of a second video segment; acquiring a first image region corresponding to the target object in a first target video frame of the first video segment, and acquiring a second image region corresponding to the target object in the current video frame of the second video segment, wherein the first target video frame corresponds to the current video frame of the second video segment in terms of video frame time; and performing picture splicing on the first target video frame and the current video frame of the second video segment according to the first image region and the second image region to obtain a processed first video frame.

18 Claims, 9 Drawing Sheets

(51) Int. Cl.
  *G11B 27/036* (2006.01)
  *G11B 27/06* (2006.01)
  *H04N 7/01* (2006.01)
  *G06V 20/40* (2022.01)

(52) U.S. Cl.
  CPC ............. *G11B 27/06* (2013.01); *H04N 7/013* (2013.01); *G06T 2207/10016* (2013.01)

(56) References Cited

U.S. PATENT DOCUMENTS

| | | |
|---|---|---|
| 2019/0215496 A1 | 7/2019 | Mullis et al. |
| 2020/0036909 A1 | 1/2020 | Caspi |

FOREIGN PATENT DOCUMENTS

| | | |
|---|---|---|
| CN | 109922294 A | 6/2019 |
| CN | 110070551 A | 7/2019 |
| CN | 110211076 A | 9/2019 |
| CN | 110557556 A | 12/2019 |
| CN | 110675420 A | 1/2020 |
| CN | 110730296 A | 1/2020 |
| CN | 110969569 A | 4/2020 |
| EP | 3 599 607 A1 | 1/2020 |
| JP | 2004-328788 A | 11/2004 |
| KR | 2009-0117771 A | 11/2009 |
| KR | 2016-0021501 A | 2/2016 |
| WO | WO 2016/152634 A1 | 9/2016 |

OTHER PUBLICATIONS

Shao-Ping Lu et al: "Timeline Editing of Objects in Video", IEEE Transactions on Visualization and Computer Graphics, vol. 19, No. 7, Jul. 2013, pp. 1218-1227.
Extended European Search Report in European Application No. 20199670.9, dated Mar. 19, 2021.
First Office Action of Chinese Application No. 202010345830.3, dated Apr. 28, 2021.
Notification of Reason for Refusal dated Mar. 16, 2022, Korean Intellectual Property Office, issued in counterpart Korean Application No. 10-2020-0167930.

* cited by examiner

METHOD AND APPARATUS FOR PROCESSING VIDEO, AND STORAGE MEDIUM

CROSS-REFERENCE TO RELATED APPLICATIONS

This application is based upon and claims priority to Chinese Patent Application No. 202010345830.3, filed on Apr. 27, 2020, the content of which is hereby incorporated by reference in its entirety.

TECHNICAL FIELD

The present disclosure relates to the technical field of computers, and more particularly, to a method and apparatus for processing a video, and a storage medium.

BACKGROUND

As a relatively common video effect technology, the clone effect of videos is manifested in that multiple same objects (such as persons and objects) appear simultaneously in a same scenario of the video (i.e., a frame of image of the video). For example, the clone effect for a person A may be manifested in that multiple persons A appear in a same scenario of the video, and each person A may have the consistent action, and may also have different actions. When there is a need to obtain a video with the clone effect, generally, several original video segments are first photographed to serve as source materials; then, the photographed source materials are spliced by the professionals with the use of a video post-editing tool; and at last, several cloned bodies of the same object appear in the same scenario of the video simultaneously. In the above manner, the source materials are first photographed and then the clone effect is produced subsequently, such that the production period is long. During photographing, a feedback may not be obtained in time. Furthermore, the photographing of source materials needs to be planned in advance (for example, selection of scenarios, determination of view finding positions, etc.), which results in a tedious preparation process; and the source materials are subsequently processed by the professionals having specialized knowledge, thus there are high requirements on the specialized knowledge, and great difficulties for implementing the clone effect.

SUMMARY

According to a first aspect of the embodiments of the present disclosure, a method for processing a video, applied to a terminal device, may include: identifying a target object in a first video segment; acquiring a current video frame of a second video segment; acquiring a first image region corresponding to the target object in a first target video frame of the first video segment, and acquiring a second image region corresponding to the target object in the current video frame of the second video segment, wherein the first target video frame corresponds to the current video frame of the second video segment in terms of video frame time; and performing picture splicing on the first target video frame and the current video frame of the second video segment according to the first image region and the second image region to obtain a processed first video frame.

According to a second aspect of the embodiments of the present disclosure, an apparatus for processing a video may include: a processor; and a memory configured to store instructions executable by the processor. The processor is configured to: identify a target object in a first video segment; acquire a current video frame of a second video segment; acquire a first image region corresponding to the target object in a first target video frame of the first video segment, and acquire a second image region corresponding to the target object in the current video frame of the second video segment, the first target video frame corresponding to the current video frame of the second video segment in terms of video frame time; and perform picture splicing on the first target video frame and the current video frame of the second video segment according to the first image region and the second image region to obtain a processed first video frame.

According to a third aspect of the embodiments of the present disclosure, a non-transitory computer-readable storage medium has stored thereon instructions that, when executed by a processor of a device, cause the device to perform a method for processing a video, the method including: identifying a target object in a first video segment; acquiring a current video frame of a second video segment; acquiring a first image region corresponding to the target object in a first target video frame of the first video segment, and acquiring a second image region corresponding to the target object in the current video frame of the second video segment, wherein the first target video frame corresponds to the current video frame of the second video segment in terms of video frame time; and performing picture splicing on the first target video frame and the current video frame of the second video segment according to the first image region and the second image region to obtain a processed first video frame.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
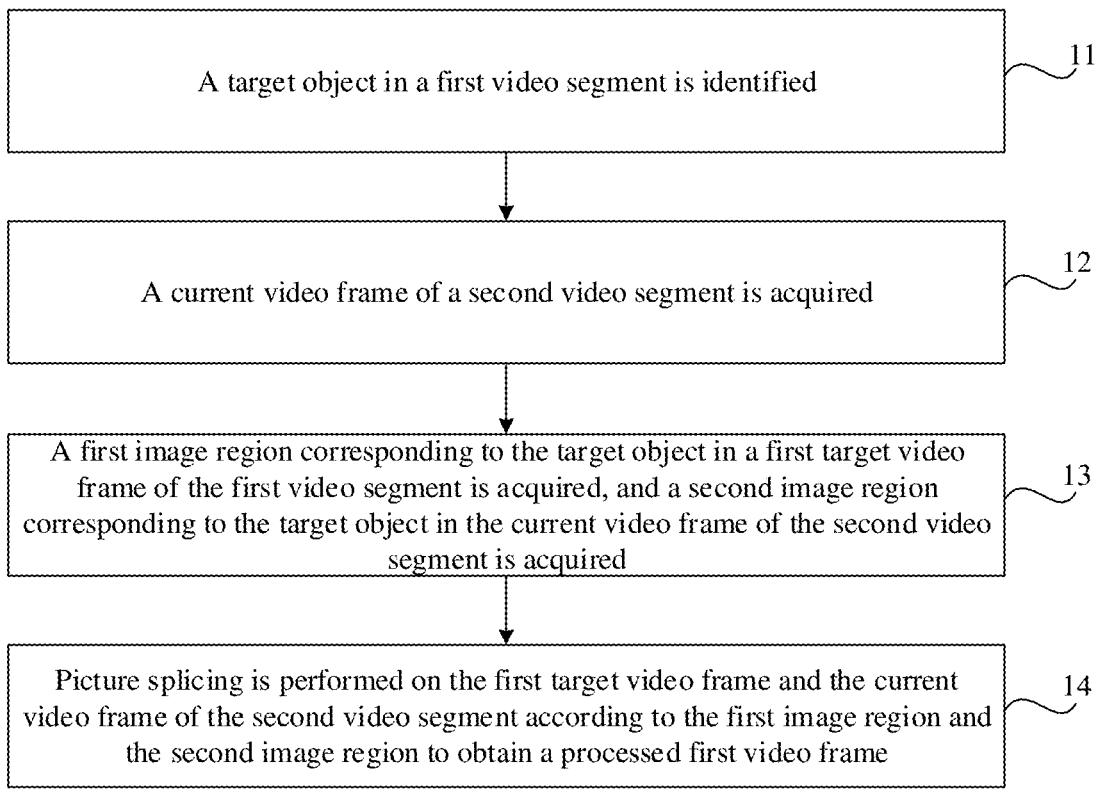
FIG. 1 is a flowchart of a method for processing a video according to an exemplary embodiment.

FIG. 1 is a flowchart of a method for processing a video according to an exemplary embodiment. The method may be applied to a terminal device. The terminal device may be, for example, a mobile phone, a computer, a messaging device, a tablet device, a Personal Digital Assistant (PDA), and the like. As shown in FIG. 1, the method may include the following operations.

In operation 11, a target object in a first video segment is identified.

In operation 12, a current video frame of a second video segment is acquired.

In operation 13, a first image region corresponding to the target object in a first target video frame of the first video segment is acquired, and a second image region corresponding to the target object in the current video frame of the second video segment is acquired.

In operation 14, picture splicing is performed on the first target video frame and the current video frame of the second video segment according to the first image region and the second image region to obtain a processed first video frame.

In the embodiment, based on the two existing segments of videos, for two video frames having the corresponding time in the two segments of videos, a picture portion including the target object in one video frame is spliced with a picture portion including the target object in the other video frame to obtain the processed first video frame; and therefore, based on such a first video frame, a spliced video having the clone effect can be quickly obtained in the subsequent process, the complex manual post edition by a user turns out to be unnecessary, and the processing efficiency is high.

In an embodiment, the target object may be a living creature (such as a person, an animal, and a plant), and may also be a lifeless object (such as a disk and a computer). The method may implement the clone effect of the target object, i.e., to enable the processed video to include, in a same scenario, at least two pictures of the target object photographed by a terminal device at different time.

In an embodiment, the first video segment is a segment of video photographed by the terminal device and including the target object. The target object may be photographed by the terminal device to obtain the first video segment. For example, if the clone effect of the person A needs to be produced, the person A is the target object, and the user may photograph the person A by operating the terminal device so that the picture includes the person A and the background that is not the person A; and upon the completion of photographing, the first video segment may be obtained.

In an embodiment, the first video segment may be obtained through the following manner: in response to a first video segment photographing instruction, a video stream acquired in real time is recorded until a first video segment photographing stop instruction is received; and the recorded video stream is taken as the first video segment.

The first video segment photographing instruction is configured to instruct to photograph the first video segment, the first video segment photographing stop instruction is configured to instruct to end the photographing at the present time, and the video stream is a video frame captured by the terminal device, such as a viewing frame of the terminal device, in real time. Hence, the first video segment is the video stream recorded by the terminal device during the period from the reception of the first video segment photographing instruction to the reception of the first video segment photographing stop instruction.

The first video segment photographing instruction and the first video segment photographing stop instruction may be generated by the operation of the user on the terminal device. For example, the terminal device may be provided with a photographing start button, such as a physical button or a virtual button, for photographing the first video segment. If the user clicks the button, the first video segment photographing instruction is generated correspondingly. The terminal device may be provided with a photographing stop button for instructing to stop photographing the first video segment. If the user clicks the button, the first video segment photographing stop instruction is generated correspondingly. The photographing start button and the photographing stop button may be the same button, and may also be different buttons. Also for example, the terminal device may be provided with a press region, such as a region on a screen of the terminal device or a region on a body of the terminal device, for photographing the first video segment. If the user presses the region, the first video segment photographing instruction is generated correspondingly. If the user no longer presses the region, for example, a finger of the user changes from a state of pressing the region into a state of lifting from the pressed region, the first video segment photographing stop instruction is generated. In other words, the pressing operation means to photograph, and the releasing operation means to stop photographing.

In an embodiment, the first video segment photographing stop instruction may be generated upon the first video segment photographing instruction. For example, a photographing duration may be set in advance; upon detecting the first video segment photographing instruction, the time is counted; and when the counted duration reaches the photographing duration, the first video segment photographing stop instruction is generated. In such a scenario, the duration of the first video segment is equal to the photographing duration set in advance.

Identifying the target object in the first video segment in operation 11 may be implemented by identifying the target object in a video frame included in the first video segment. In an embodiment, operation 11 may include the following operation: according to a third video frame, pixels corresponding to the target object in the third video frame are determined through a target object identification model.

Figure 2:
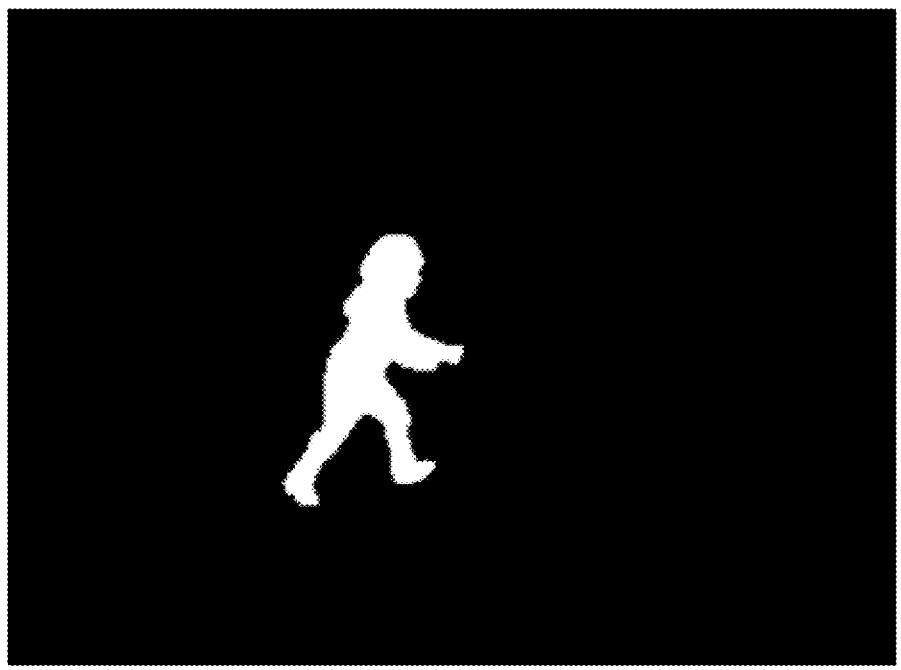
FIG. 2 shows a result for identifying a target object in a method for processing a video according to an exemplary embodiment.

The third video frame is a frame of video in the first video segment. The target object identification model may identify whether each pixel in the image belongs to the target object. In an embodiment, after the third video frame is input to the target object identification model, an output result as shown in FIG. 2 may be obtained. The white portion in FIG. 2 indicates the target object, and the black portion in FIG. 2 indicates the non-target object.

In an embodiment, the target object identification model may be obtained through the following manners: training data is acquired, each training data including a historical image and labeling information indicating whether each pixel in the historical image belongs to the target object, and an image segmentation model is trained according to the training data to obtain the target object identification model.

In an embodiment, the image segmentation model belongs to a neutral network model. During training each time, the historical image is taken as input data of the image segmentation model, and labeling information corresponding to the historical image is taken as a true output of the model, so as to adjust parameters in the model. Through multiple times of training, when a model training stop condition is met, the obtained model is used as the target object identification model.

By determining the pixels corresponding to the target object, the position of the target object in the third video frame may be positioned. Additionally, an image region corresponding to the target object in the third image frame can further be intactly extracted from the third video frame according to these pixels corresponding to the target object.

In an embodiment, to identify the target object in the first video segment, the target object may be identified in each video frame of the first video segment; and by viewing each video frame in the first video segment as the third video frame, the above operation is executed. Furthermore, as mentioned above, by identifying the target object in the first video segment, the position of the target object in each video frame of the first video segment can be positioned, and the image region corresponding to the target object in each video frame of the first video segment can further be extracted intactly.

As described above, in operation 12, a current video frame of a second video segment is acquired.

In an embodiment, the second video segment is a segment of video photographed by the terminal device and including the target object. In the embodiment, the method may splice the target objects in the first and second video segments to the same picture correspondingly. In another embodiment, the second video segment may be obtained through the following manner: in response to a video photographing instruction, a video stream acquired in real time is recorded until a video photographing stop instruction is received, and the recorded video stream is taken as the second video segment.

The video photographing instruction is configured to instruct to photograph the second video segment, and the video photographing stop instruction is configured to indicate to end the photographing of the second video segment at this time. The second video segment is the video stream recorded by the terminal device in the period from the reception of the video photographing instruction to the reception of the video photographing stop instruction.

The video photographing instruction and the video photographing stop instruction may be generated by the operation of the user on the terminal device. For example, the terminal device may be provided with a photographing start button, such as a physical button or a virtual button, for photographing the second video segment. If the user clicks the button, the video photographing instruction is generated correspondingly. The terminal device may be provided with a photographing stop button for instructing to stop photographing the second video segment. If the user clicks the button, the video photographing stop instruction is generated correspondingly. The photographing start button and the photographing stop button may be the same button, and may also be different buttons. Also for example, the terminal device may be provided with a press region, such as a region on a screen of the terminal device or a region on a body of the terminal device, for photographing the second video segment. If the user presses the region, the video photographing instruction is generated correspondingly. If the user no longer presses the region, for example, a finger of the user changes from a state of pressing the region into a state of lifting from the pressed region, the video photographing stop instruction is generated. In other words, the pressing operation means to photograph, and the releasing operation means to stop photographing.

In an embodiment, the video photographing stop instruction may be generated upon the video photographing instruction. For example, a photographing duration may be set in advance; upon detecting the video photographing instruction, the time is counted; and when the counted duration reaches the photographing duration, the video photographing stop instruction is generated. In such a scenario, the duration of the second video segment is equal to the photographing duration set in advance.

Each video frame in the second video segment may serve as the current video frame of the second video segment.

As described above, in operation 13, a first image region corresponding to the target object in a first target video frame of the first video segment is acquired, and a second image region corresponding to the target object in the current video frame of the second video segment is acquired.

The first target video frame of the first video segment corresponds to the current video frame of the second video segment in terms of video frame time.

It is to be noted that the time correspondence herein does not refer to that the timestamps are consistent, but refers to that the first video segment and the second video segment are in a corresponding relationship in time sequence. The corresponding relationship may be that an Nth video frame of the first video segment corresponds to an Mth video frame of the second video segment, and M and N may be the same, and may also be different.

By identifying the target object in the first video segment (i.e., identifying the pixel in each video frame of the first video segment that belongs to the target object) in operation 11, the position of the target object in each video frame of the first video segment can be positioned, and an image region corresponding to the target object in each video frame of the first video segment can further be extracted intactly. Therefore, by means of operation 11, the target object can be identified from the first target video frame of the first video segment; and thus, the first image region corresponding to the target object in the first target video frame can be acquired.

Referring to the above method for identifying the target object, based on the same principle, the target object in the current video frame of the second video segment may be identified; and thus, the position of the target object in the current video frame of the second video segment may be identified based on the identification result, and an image region corresponding to the target object in the current video frame of the second video segment can be extracted intactly, i.e., the second image region corresponding to the target object in the current video frame of the second video segment can be acquired.

As described above, in operation 14, picture splicing is performed on the first target video frame and the current video frame of the second video segment according to the first image region and the second image region to obtain a processed first video frame.

Accordingly, the obtained first video frame not only includes an image content (i.e., the second image region) corresponding to the target object in the current video frame of the second video segment, but also includes an image content (i.e., the first image region) corresponding to the target object in the first target video frame of the first video segment, thus a new image generated by the picture splicing and having the clone effect is obtained.

Figure 3:
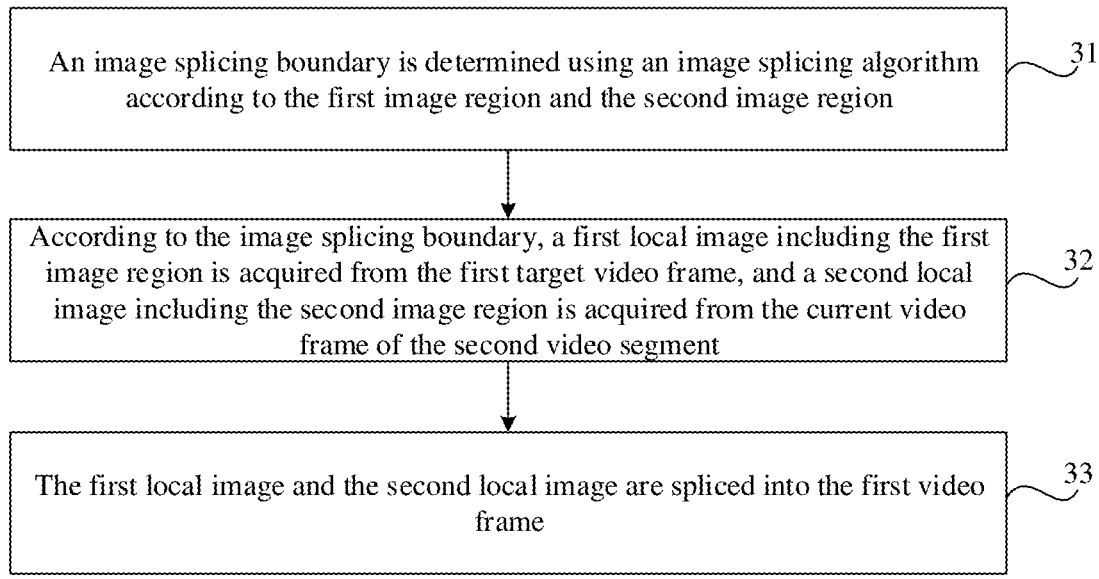
FIG. 3 is a flowchart of an operation for performing picture splicing according to an exemplary embodiment.

In an embodiment, as shown in FIG. 3, operation 14 may include the following operations.

In operation 31, an image splicing boundary is determined using an image splicing algorithm according to the first image region and the second image region.

The image splicing algorithm may be an existing image splicing algorithm, an image fusion algorithm, or the like. For two or multiple images, after a portion in need of being kept in each picture is determined, pixels suitable for being taken as a splicing boundary and spliced with other images in each image can be determined by the image splicing algorithm, and multiple pixels can form the splicing boundary; and therefore, upon the determination that the first image region and the second image region need to be kept, the image splicing boundary can be directly determined by the image splicing algorithm according to the first target video frame of the first video frame, the first image region, the current video frame of the second video segment and the second image region.

In operation 32, according to the image splicing boundary, a first local image including the first image region is acquired from the first target video frame, and a second local image including the second image region is acquired from the current video frame of the second video segment.

For example, with the image splicing boundary as a dividing line, all pixels located on the same side of the image splicing boundary with the first image region are acquired from the first target video segment to serve as the first local image. Also for example, besides all pixels located on the same side of the image splicing boundary with the first image region in the first target video frame, the first local image further includes a part or all of pixels located at the image splicing boundary.

For example, with the image splicing boundary as a dividing line, all pixels located on the same side of the image splicing boundary with the second image region are acquired from the current video frame of the second video segment to serve as the second local image. Also for example, besides all pixels located on the same side of the image splicing boundary with the second image region in the current video frame of the second video segment, the second local image further includes a part or all of pixels located at the image splicing boundary.

The first local image and the second local image may form an image having the consistent size with the original video frame.

In operation 33, the first local image and the second local image are spliced into the first video frame.

The first local image and the second local image obtained in operation 32 may be directly spliced to obtain a new image to serve as the processed first video frame.

In an embodiment, the user may first photograph the video by the terminal device to obtain the first video segment; and upon the completion of the first video photographing, the user may continue to photograph the video by the terminal device for a second time to obtain the second video segment. Thereafter, based on two video frames corresponding to each other in the first video segment and the second video segment, operation 11 to operation 14 are executed to obtain the processed first video frame; and the first video frame has the clone effect for the target object.

In the embodiment, the target object in the first video segment is identified; the current video frame of the second video segment is acquired; the first image region corresponding to the target object in the first target video frame of the first video segment is acquired, and the second image region corresponding to the target object in the current video frame of the second video segment is acquired; and the picture splicing is performed on the first target video frame and the current video frame of the second video segment according to the first image region and the second image region to obtain the processed first video frame. The first target video frame and the current video frame of the second video segment are corresponding in terms of video frame time. In this way, based on the two existing segments of videos, for two video frames having the corresponding time in the two segments of videos, a picture portion including the target object in one video frame is spliced with a picture portion including the target object in the other video frame to obtain the processed first video frame; and therefore, upon such a first video frame, a spliced video having the clone effect can be quickly obtained in the subsequent process, the complex manual post edition by a user turns out to be unnecessary, and the processing efficiency is high.

The first video segment and the second video segment may not be completely consistent in photographing angle, photographing position and photographing method to result in position transformation of the picture between the video frame of the first video segment and the video frame of the second video segment. The related position transformation may include, but not limited to, at least one of the followings: translation, rotation, stretch, zoom-in, zoom-out and distortion. As a consequence, in order to make the picture content in the spliced first video frame more harmonious, and avoid the overlarge position difference between the target objects on the same picture (for example, the target object is located on the ground during photographing; and as the terminal device moves vertically when photographing the first video segment and the second video segment, such that one target object is located on the high ground and another target object is located on the low ground in the spliced picture), before the picture splicing is performed on the first target video frame and the current video frame of the second video segment, picture alignment processing may further be performed.

According to some embodiments, before operation 14 that the picture splicing is performed on the first target video frame and the current video frame of the second video segment according to the first image region and the second image region, the method may further include the following operations: a target frame in the first video segment is determined as a reference frame; picture alignment processing is performed on the first target video frame and the reference frame; and/or the picture alignment processing is performed on the current video frame of the second video segment and the reference frame. The target frame may be any frame in the first video segment. For example, the target frame may be a first video frame in the first video segment.

The picture alignment processing is performed on the first target video frame and the reference frame, and/or the picture alignment processing is performed on the current video frame of the second video segment and the reference frame. According to some embodiments, the picture alignment processing may include the following operations: target background feature points each having a same background feature in the reference frame and in a specified video frame are acquired from among background feature points of the reference frame and of the specified video frame; and the specified video frame is aligned to the reference frame according to the target background feature points. The specified video frame is one of the first target video frame or the current video frame of the second video segment.

In the embodiment, the first video segment and the second video segment are generally photographed in the same environment; and positions and states of the target objects in the first and second video segments may change over time, and the background other than the target objects in the picture tends to be static, thus the picture alignment may be performed by taking the background in the video frame as the reference.

With the feature extraction algorithm, the background feature points of the reference frame can be extracted, and the background feature points of the specified video frame can be extracted; and based on respective background feature points of the two frames, the feature points each having a same background feature in two frames can be determined to serve as the target background feature points. In an embodiment, the manner for extracting the feature points with the feature extraction algorithm is a conventional method, which may be the common technical means in the field.

According to the positions of the target background feature points in the reference frame, and the positions of the target background feature points in the specified video frame, a transformation matrix for representing position transformation of the target feature points in the picture may be obtained. For example, the current common least square method may be used to obtain the transformation matrix. Also for example, the transformation matrix may be a 3*3 matrix.

As described above, the specified video frame is one of the first target video frame or the current video frame of the second video segment. The first video frame may be aligned to the reference frame based on the transformation matrix between the first target video frame and the reference frame, and/or the current video of the second video segment may be aligned to the reference frame based on the transformation matrix between the current video frame of the second video segment and the current frame. In this way, it can be ensured that when the picture splicing is performed on the first target video frame and the current video frame of the second video segment, the pictures may be aligned to each other as much as possible, and the picture in each part of the first video frame is consistent in structure, thereby improving the quality of picture of the first video frame and making the picture more harmonious visually.

In some embodiments, the method may further include the following operations: a target video segment is generated based on the first video segment; the target video segment is displayed in the video preview interface.

In an embodiment, multiple video frames including the first video frame may be composited to form the target video segment; and the target video segment is displayed in the video preview interface. Other video frames in the target video segment may be directly from the first video segment or directly from the second video segment, or, other video frames in the target video segment may be video frames generated in a manner same as the first video frame and having the clone effect.

For example, with the advancement of the time, e.g., from the first frame of the video segment to the last frame of the video segment, the current video frame of the second video segment changes over time; and correspondingly, the first target video frame corresponding to the current video frame of the second video segment in terms of time also changes over time. In this way, whenever the current video frame of the second video segment is obtained, the above operation 11 to operation 14 may be executed, to obtain multiple processed first video frames correspondingly; and based on these first video frames and corresponding time sequences of these video frames in the first video segment (i.e., corresponding sequences in the second video segment, as described above, the first video frame is generated based on the video frames having time correspondences in the first video segment and the second video segment), the target video segment may be generated.

By means of the above manner, after the processed first video frame is obtained, the target video segment may be generated directly based on the first video frame, i.e., the video segment having the clone effect is generated.

In some embodiments, before operation 14, the method may further include the following operation: duration alignment processing is performed on the first video segment and the second video segment in a case where the first video segment is different from the second video segment in duration.

As the first video segment and the second video segment are photographed respectively, both may have different durations. In this case, before the picture splicing is performed on the first target video frame and the current video frame of the second video segment, the duration alignment processing may further be performed on the first video segment and the second video segment.

For example, the duration alignment processing may include any one of the following manners.

In a first manner, with a video segment having a shorter duration among the first and second video segments as a reference, a part of video frames in a video segment having a longer duration among the first and second video segments are deleted, such that the first video segment is the same as the second video segment in duration.

In a first manner, according to existing video frames in the video segment having the shorter duration among the first and second video segments, video frames are increased to the video segment having the shorter duration, such that the first video segment is the same as the second video segment in duration.

In the first manner, the duration alignment processing may be to delete a part of video frames in the video segment having the longer duration by taking the video segment having the shorter duration as the reference, such that the first video segment is the same as the second video segment in duration.

For example, if the first video segment includes 300 video frames, and the second video segment includes 500 video frames, the 301st to 500th video frames in the second video segment may be deleted from the second video segment, and the front 300 frames in the second video frame are kept to serve as the second video segment used in the above processing.

In the second manner, the alignment processing may be to expand the video frames in the video segment having the shorter duration by taking the video segment having the longer duration as the reference. That is, according to existing video frames in the video segment having the shorter duration among the first and second video segments, the video frames are increased to the video segment having the shorter duration, such that the first video segment is the same as the second video segment in duration.

The expansion may be implemented circularly or reciprocally based on the existing video frames in the video segment having the shorter duration.

For example, it is assumed that the first video segment includes 300 video frames, the second video segment includes 200 video frames, and the video frames in the second video segment are sequentially numbered as u1 to u200. If the circular manner is used for expansion, the second video segment may be expanded as u1, u2, u3, . . . , u199, u200, u1, u2, u3, . . . , u100. If the reciprocal manner is used for expansion, the second video segment may be expanded as u1, u2, u3, . . . , u199, u200, u199, u198, . . . , u100.

In some embodiments, the method may further include the following operations: a photographing parameter when the image capturing apparatus captures the first video segment is acquired; and the image capturing apparatus is controlled to capture an image according to the photographing parameter to obtain the second video segment.

When the second video segment is photographed by the image capturing apparatus, the photographing parameter when the image capturing apparatus photographs the first video segment may be directly used. For example, when the image capturing apparatus starts to photograph the first video segment, the photographing parameter of the image capturing apparatus may be locked; and thus, when the second video segment is photographed, the image capturing apparatus may photograph the second video segment automatically based on the photographing parameter consistent with the first video segment.

The photographing parameter of the image capturing apparatus may include, but not limited to, at least one of the followings: ISO, exposure time, a focusing distance and a white balance parameter.

By means of the above manner, when the second video segment is photographed, the photographing parameter corresponding to the first video segment can be used automatically, such that the manual adjustment of the user turns out to be unnecessary, and the problem of tedious setting of the photographing parameter can be solved; and additionally, by photographing the first video segment and the second video segment with the same photographing parameter, both the first video segment and the second video segment can further appear the similar picture to be advantageous for the subsequent video processing.

Figure 4:
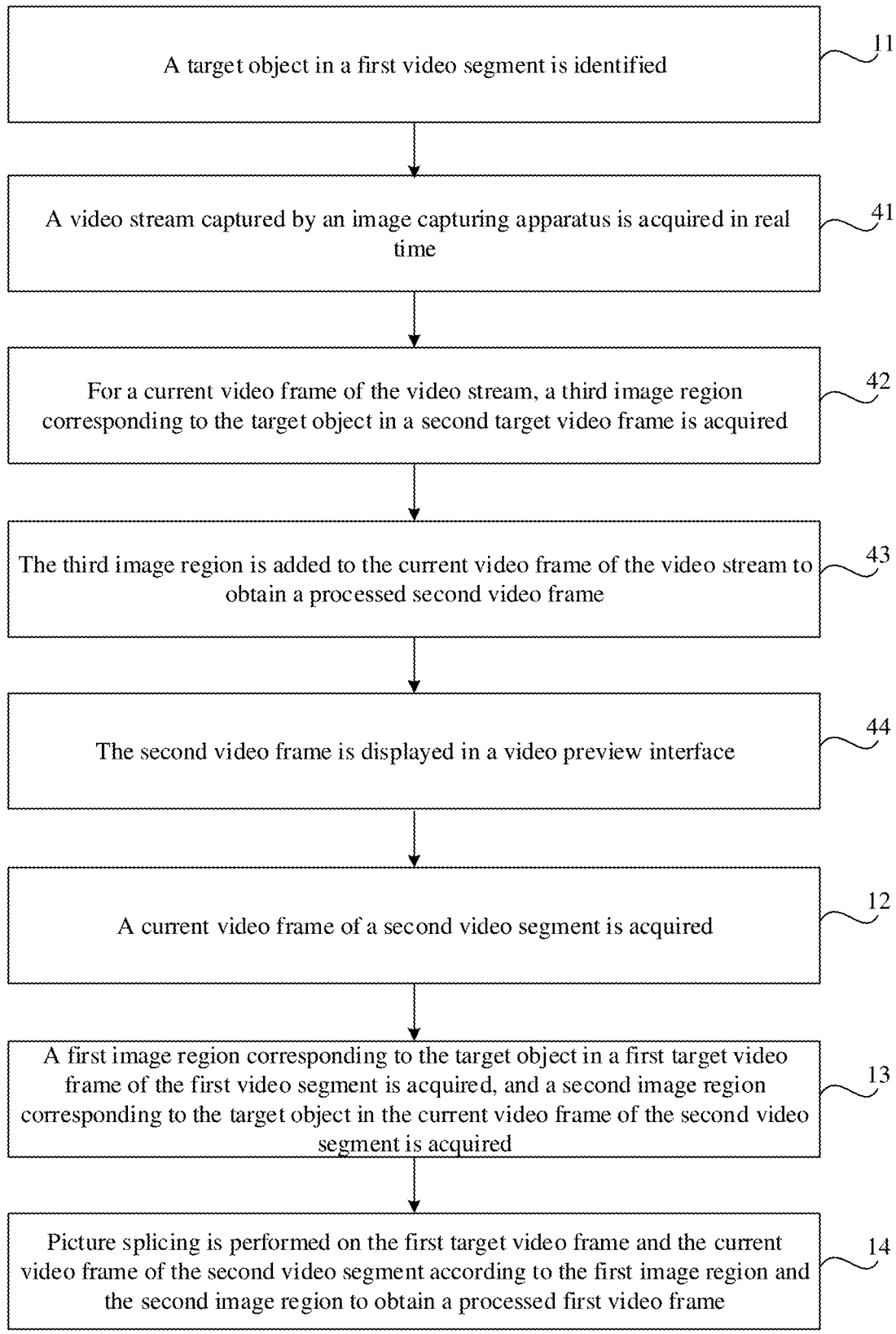
FIG. 4 is a flowchart of a method for processing a video according to another exemplary embodiment.

Embodiments of the present disclosure may further provide a splice preview function in real time based on a photographed content of the first video segment. In some embodiments, the method according to the present disclosure may further include the following operations, as shown in FIG. 4.

In operation 41, a video stream captured by an image capturing apparatus is acquired in real time.

In operation 42, for a current video frame of the video stream, a third image region corresponding to the target object in a second target video frame is acquired.

In operation 43, the third image region is added to the current video frame of the video stream to obtain a processed second video frame.

In operation 44, the second video frame is displayed in a video preview interface.

The video stream may be considered as a video frame transmitted in real time. With the terminal device for example, the terminal device can acquire a series of video frames in real time by a viewing frame of the image capturing apparatus; the series of video frames form the video stream; and the video frame that can be acquired at present is the current video frame of the video stream. As described in operation 41, the terminal device can acquire, in real time, the video stream captured by the image capturing apparatus.

In operation 42, for the current video frame of the video stream, the terminal device acquires the third image region corresponding to the target object in the second target video frame.

The second target video frame is a video frame corresponding to the current video frame of the video stream in the first video segment in terms of time. It is to be noted that the time correspondence herein does not refer to that the timestamps are consistent but the first video segment and the video stream are in a corresponding relationship in time sequence. The corresponding relationship may be that a Kth video frame of the first video segment corresponds to an Ith video frame of the video stream, and both the K and the I may be the same.

After the target object is identified in operation 11 (for example, through the target object identification model), the position of the target object in some video frame can be positioned, and an image region corresponding to the target object in the video frame can be extracted intactly. Therefore, according to the current video frame of the video stream, the third image region corresponding to the target object in the second target video frame can be acquired by identifying the target object. The identification of the target object has been described above and will not be elaborated herein. Meanwhile, the acquisition of the third image region also has the same principle with the above acquisition of the first image region and no more details are elaborated herein.

In operation 43, the third image region is added to the current video frame of the video stream to obtain the processed second video frame.

In an embodiment, operation 43 may include the following operations: an added position where the third image region is added in the current video frame of the video stream is determined according to a position where the third image region is located in the second target video frame; and the third image region is added to the added position in the current video frame of the video stream.

In an embodiment, the operation that the added position where the third image region is added in the current video frame of the video stream is determined according to the position where the third image region is located in the second target video frame may include the following operation: a position, consistent with the position where the third image region is located in the second target video frame, in the current video frame of the video stream is used as the added position where the third image region is added in the current video frame of the video stream.

In other words, if the position where the third image region is located in the second target video frame corresponds to a position coordinate set D1, the position coordinate set D1 may be used as the added position where the third image region is added in the current video frame of the video stream.

In another embodiment, the operation that the added position where the third image region is added in the current video frame of the video stream is determined according to the position where the third image region is located in the second target video frame may include the following operations: first background feature points within a preset proximity range of the third image region are acquired from among background feature points of the second target video frame; second background feature points each having a same background feature with a respective one of the first background feature points are determined from among background feature points of the current video frame of the video stream; and the added position is determined according to positions where the second background feature points are located in the current video frame of the video stream.

The background feature points of the second target video frame can be extracted by the above feature extraction algorithm. The first background feature points within the preset proximity range of the third image region may be determined according to the positions where the background feature points of the second target video frame are located in the second target video frame, and in combination with the position where the third image region is located in the second target video frame.

Correspondingly, the background feature points of the current video frame of the video stream can be extracted by the above feature extraction algorithm; and thus, the second background feature points each having a same background feature with a respective one of the first background feature points may be determined from among background feature points of the current video frame of the video stream.

The added position is determined according to the positions where the second background feature points are located in the current video frame of the video stream, and the added position is a position surrounding by the second background feature points.

Additionally, the first video segment and the video stream may not be completely consistent in photographing angle and photographing method to result in position transformation of the picture between the video frame of the first video segment and the video frame of the video stream. The related position transformation may include, but not limited to, at least one of the followings: translation, rotation, stretch, zoom-in, zoom-out and distortion. As a consequence, in order to make the previewed picture content more harmonious, and avoid the overlarge position difference between the target objects on the same picture in the preview interface (for example, the target object is located on the ground during photographing; and as the terminal device moves vertically when photographing the first video segment and the video stream, such that one target object is located on the high ground and another target object is located on the low ground in the spliced picture), before the third image region is added to the current video frame of the video stream, the picture alignment processing may further be performed.

In some embodiments, before the operation that the third image region is added to the current video frame of the video stream, the method may further include the following operation: the picture alignment processing is performed on the second target video frame and the current video frame of the video stream.

For example, the picture alignment processing may include the following operations: third background feature points having a same background feature are acquired from the background feature points of the second target video frame and the current video frame of the video stream; and the second target video frame is aligned to the current video frame of the video stream according to the third background feature points.

In the embodiment, the first video segment and the video stream are generally photographed in the same environment; and positions and states of the target objects in the first video segment and the video stream may change over time, and the background other than the target objects in the picture tends to be static, thus the picture alignment may be performed by taking the background in the video frame as the reference.

With the feature extraction algorithm, the background feature points of the second target video frame can be extracted, and the background feature points of the current video frame of the video stream can be extracted; and based on respective background feature points of the two frames, the feature points each having a same background feature in two frames can be determined to serve as the third background feature points.

According to the positions of the third background feature points in the second target video frame, and the positions of the target background feature points in the current video frame of the video stream, a transformation matrix for representing position transformation of the target feature points in the picture may be obtained. The second target video frame may be aligned to the current video frame of the video stream based on the transformation matrix.

In this way, it can be ensured that when the third image region is added to the current video frame of the video stream, the pictures may be aligned to each other as much as possible, and the picture in each part of the real-time preview interface is consistent in structure, thereby improving the quality of picture of the second video frame and making the picture more harmonious visually.

As described above, in operation 44, the second video frame is displayed in the video preview interface.

For example, after the second video frame is obtained, the second video frame is displayed in the video preview interface.

It is to be noted that when the current video frame of the video stream is previewed in real time, the attention is not paid to whether the video stream has the target object or the position of the target object; instead, only the third image region (the region corresponding to the target object in the second target video frame) is covered to the current video frame of the video stream to provide the preview for the user, such that the user can preview, in real time, the picture having the splicing effect, and then confirms the picture effect of the photographed content and determines the time for photographing the second video segment.

Accordingly, the display effect of adding the target object in the first video segment to the current picture can be viewed in real time based on the real-time preview function, thereby helping the user confirm the display effect of the photographed content; and therefore, the second video segment is recorded more accurately and the target object in the second video segment is located at a desirable position of the user.

Figure 5A:
FIG. 5A-FIG. 5C are schematic diagrams of an interface of a terminal device in an implementation process of a method for processing a video, according to an exemplary embodiment.
Figure 5B:
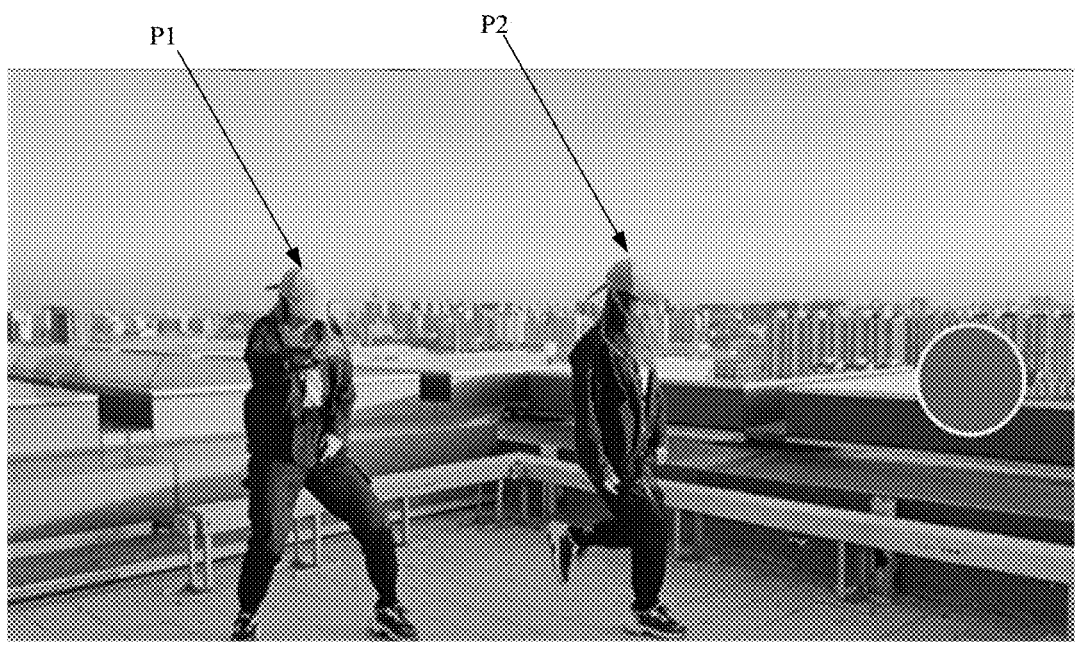
Figure 5C:
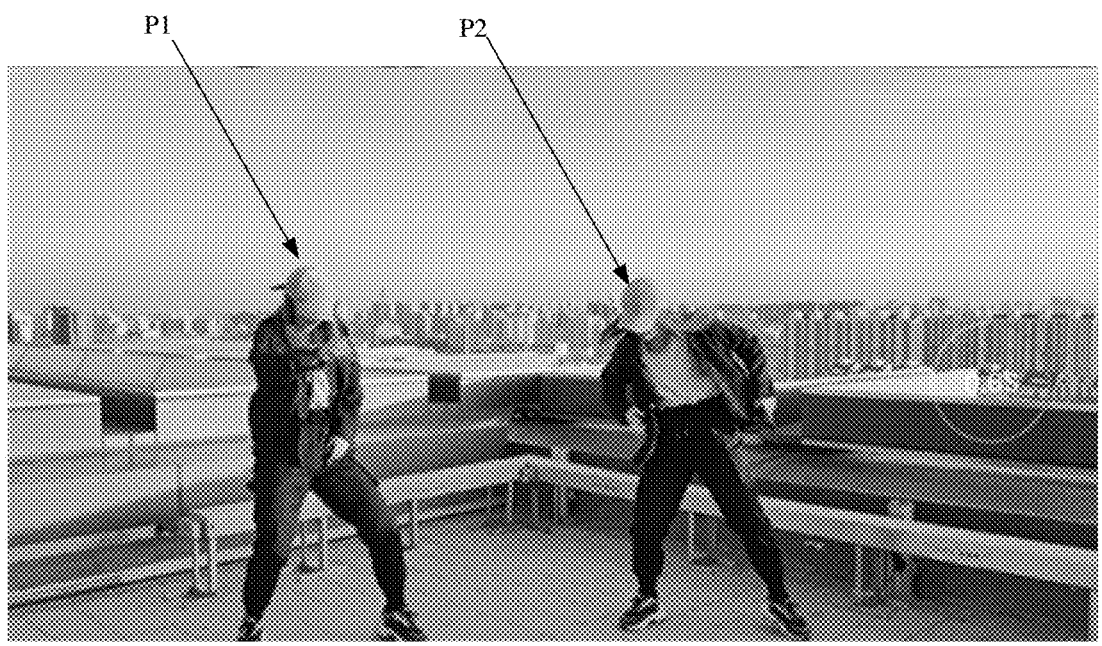

FIG. 5A-FIG. 5C are schematic diagrams of an interface of a terminal device in an implementation process of the above described method for processing a video.

FIG. 5A illustrates a display of an interface of a terminal device when the first video segment is photographed. P1 is the target object in the first video segment. As shown in FIG. 5A, when the first video segment is photographed, the target object is located on the left of the picture. The round region on the right of the picture is the photographing button. FIG. 5A shows a state that the photographing button is pressed. When the photographing button is pressed, the photographed duration is displayed in real time in the center of the round region. As can be seen from FIG. 5A, the first video segment has been photographed for 1.6 s.

FIG. 5B illustrates a display of an interface of a terminal device during real-time preview after the first video segment is photographed. The round region on the right of the picture is the photographing button. FIG. 5B shows a state that the photographing button is not pressed. As can be seen from FIG. 5B, the second video segment is not photographed but the video is previewed in real time. P2 is the target object in the video stream that is acquired by the terminal device in real time, and can reflect the position where the target object is located in fact. As can be seen from FIG. 5B, after the first segment of video is photographed, the target object moves from the position on the left of the picture to the position on the right of the picture. Referring to operation 41 to operation 44, P1 is the third image region corresponding to the target object in the second target video frame of the first video segment. The third image region is added to the current video frame of the video stream in real time to obtain the processed second video frame, and displayed in the video preview interface. Therefore, the user with the handheld terminal device may preview, in real time, what spliced picture is formed if the target object in the first video segment is added to the current picture, thereby it is possible to better control photographing of the second video segment, select the appropriate time to photograph the second video segment, and avoid the coincidence of or far distance between the target objects in the spliced video picture.

FIG. 5C illustrates a display of an interface of a terminal device when the second video segment is photographed. P2 is the target object in the first video segment. As shown in FIG. 5C, when the second video segment is photographed, the target object is located on the left of the picture. The round region on the right of the picture is the photographing button. FIG. 5C shows a state that the photographing button is pressed. When the photographing button is pressed, the photographed duration is displayed in real time in the center of the round region. As can be seen from FIG. 5C, the first video segment has been photographed for 0.6 s. P1 is the target object in the first video segment, and P2 is the target object in the video stream that is acquired by the terminal device in real time. The description and display of P1 in FIG. 5C are similar to those in FIG. 5B, i.e., when the second video segment is photographed, the terminal device still acquires the video stream in real time and still previews the video in real time. The difference between FIG. 5C and FIG. 5B lies in whether the video stream acquired in real time is recorded. The video stream acquired in real time in FIG. 5C is recorded as the second video segment. The video stream acquired in real time in FIG. 5B is not recorded. P1 is the third image region corresponding to the target object in the second target video frame of the first video segment. The third image region is added to the current video frame of the video stream in real time to obtain the processed second video frame, and displayed in the video preview interface. Therefore, when photographing the second video segment, the user with the handheld terminal device may preview, in real time, what spliced picture is formed if the target object in the first video segment is added to the current picture, thereby it is possible to better control photographing of the second video segment, and avoid the coincidence of or far distance between the target objects in the spliced video picture.

In addition, when the video preview interface displays the second video frame (previews the second video frame in real time) or the target video frame (the video segment generated by the picture splicing), an entry for canceling the operation may further be provided for the user. In other words, when the video preview interface displays the second video frame, the user may re-photograph the first video segment by canceling the operation, and when the video preview interface displays the target video frame, the user may re-photograph the second video segment by canceling the operation.

Figure 6:
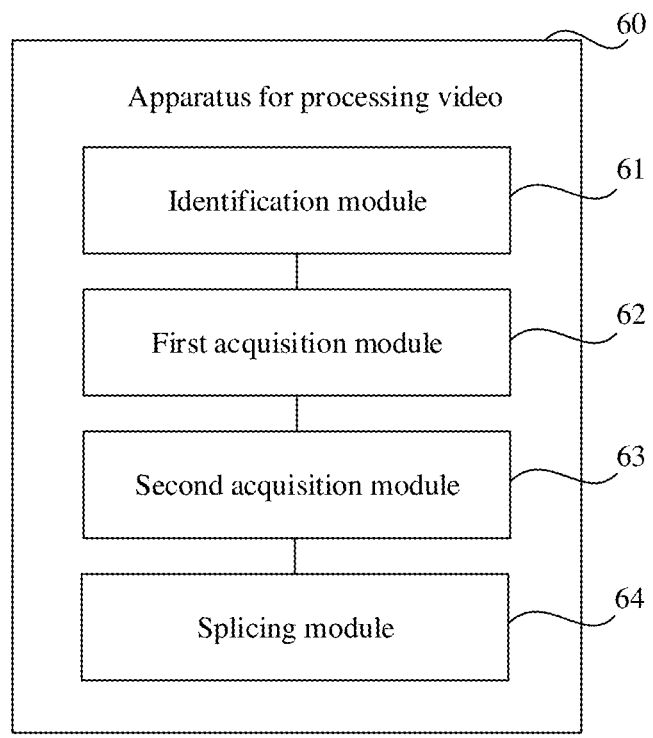
FIG. 6 is a block diagram of an apparatus for processing a video according to an exemplary embodiment.

FIG. 6 is a block diagram of an apparatus 60 for processing a video according to an exemplary embodiment, which may be applied to a terminal device. As shown in FIG. 6, the apparatus 60 may include: an identification module 61 configured to identify a target object in a first video segment; a first acquisition module 62 configured to acquire a current video frame of a second video segment; a second acquisition module 63 configured to acquire a first image region corresponding to the target object in a first target video frame of the first video segment, and acquire a second image region corresponding to the target object in the current video frame of the second video segment, the first target video frame corresponding to the current video frame of the second video segment in terms of video frame time; and a splicing module 64 configured to perform picture splicing on the first target video frame and the current video frame of the second video segment according to the first image region and the second image region to obtain a processed first video frame.

In some embodiments, the splicing module 64 includes: a first determination submodule configured to determine an image splicing boundary using an image splicing algorithm according to the first image region and the second image region; a first acquisition submodule configured to acquire, according to the image splicing boundary, a first local image including the first image region from the first target video frame, and acquire a second local image including the second image region from the current video frame of the second video segment; and a splicing submodule configured to splice the first local image and the second local image into the first video frame.

In some embodiments, the apparatus 60 further includes: a first determination module configured to, before performing the picture splicing on the first target video frame and the current video frame of the second video segment according to the first image region and the second image region, determine a target frame in the first video segment as a reference frame; a first alignment module configured to perform picture alignment processing on the first target video frame and the reference frame; and/or a second alignment module, configured to perform the picture alignment processing on the current video frame of the second video segment and the reference frame.

In some embodiments, the picture alignment processing includes: target background feature points each having a same background feature in the reference frame and in a specified video frame are acquired from among background feature points of the reference frame and of the specified video frame, the specified video frame being one of the first target video frame or the current video frame of the second video segment; and the specified video frame is aligned to the reference frame according to the target background feature points.

In some embodiments, the apparatus 60 further includes: a capturing module configured to acquire, in real time, a video stream captured by an image capturing apparatus; a third acquisition module configured to acquire, for a current video frame of the video stream, a third image region corresponding to the target object in a second target video frame, the second target video frame being a video frame corresponding to the current video frame of the video stream in the first video segment in terms of time; an addition module configured to add the third image region to the current video frame of the video stream to obtain a processed second video frame; and a first preview module configured to display the second video frame in a video preview interface.

In some embodiments, the addition module includes: a second determination submodule configured to determine an added position where the third image region is added in the current video frame of the video stream according to a position where the third image region is located in the second target video frame; and an addition submodule configured to add the third image region to the added position in the current video frame of the video stream.

In some embodiments, the second determination submodule includes: a second acquisition submodule configured to acquire first background feature points within a preset proximity range of the third image region from among background feature points of the second target video frame;

a third determination submodule configured to determine second background feature points each having a same background feature with a respective one of the first background feature points from among background feature points of the current video frame of the video stream; and a fourth determination submodule configured to determine the added position according to positions where the second background feature points are located in the current video frame of the video stream.

In some embodiments, the apparatus 60 further includes: a third alignment module configured to, before performing the picture splicing on the first target video frame and the current video frame of the second video segment according to the first image region and the second image region, in a case where the first video segment and the second video segment have different durations, perform duration alignment processing on the first video segment and the second video segment.

In some embodiments, the duration alignment processing includes any one of the following manners: with a video segment having a shorter duration among the first and second video segments as a reference, a part of video frames in a video segment having a longer duration among the first and second video segments are deleted, such that the first video segment is the same as the second video segment in duration, or according to existing video frames in the video segment having the shorter duration among the first and second video segments, video frames are increased to the video segment having the shorter duration, such that the first video segment is the same as the second video segment in duration.

In some embodiments, the apparatus 60 further includes: a video generation module configured to generate a target video segment based on the first video segment; and a second preview module configured to display the target video segment in the video preview interface.

For the apparatus in the foregoing embodiments, the manner of each module in the apparatus performing an operation is described in the method embodiments in detail.

Figure 7:
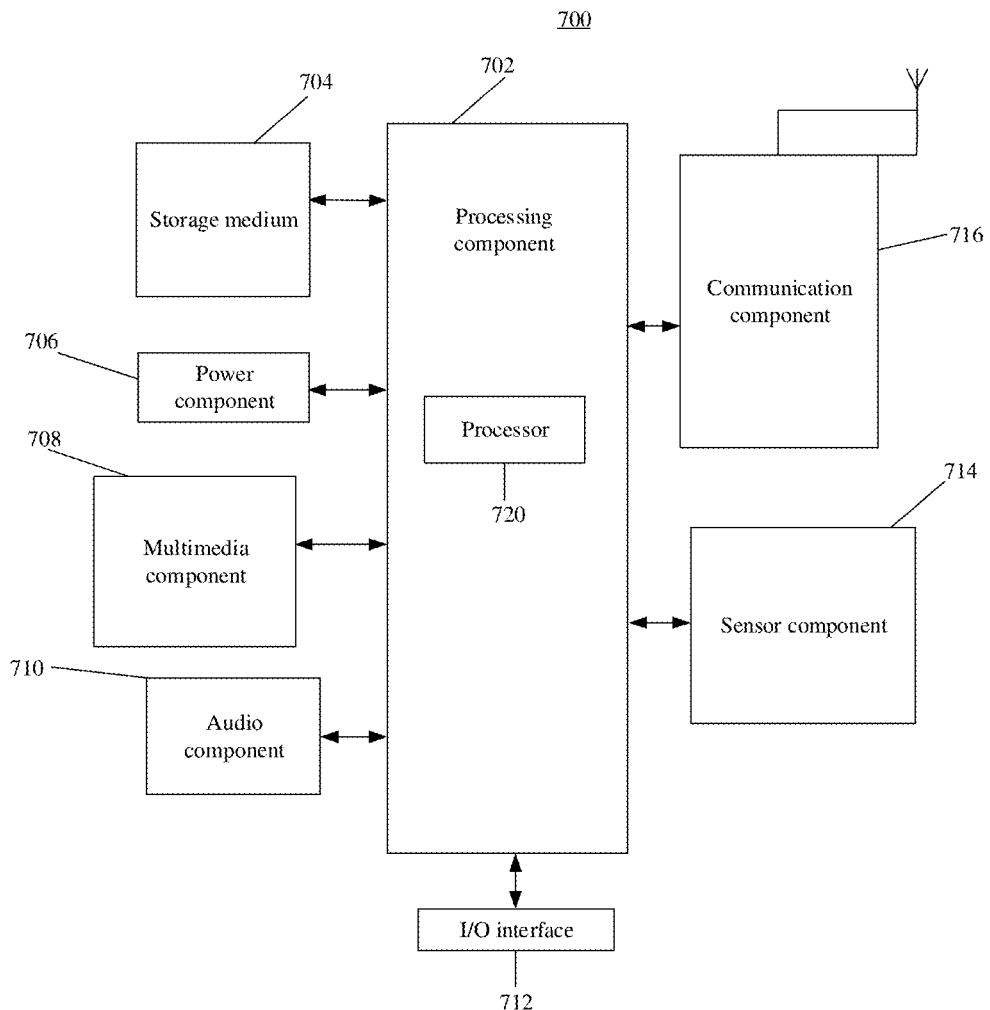
FIG. 7 is a block diagram of an apparatus for processing a video according to an exemplary embodiment.

FIG. 7 is a block diagram of an apparatus for processing a video according to an exemplary embodiment. For example, the apparatus 700 may be a mobile phone, a computer, a digital broadcast terminal device, a messaging device, a gaming console, a tablet, a medical device, exercise equipment, a PDA, and the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the operations in the above method for processing a video. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power sources, and any other components associated with the generation, management, and distribution of power in the apparatus 700.

The multimedia component 708 includes a screen providing an output interface between the apparatus 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive external multimedia data when the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the apparatus 700 is in an operation mode, such as a call mode, a recording mode, and a voice recognition mode. The received audio signal may further be stored in the memory 704 or transmitted via the communication component 716. In some embodiments, the audio component 710 further includes a speaker configured to output audio signals.

The I/O interface 712 provides an interface between the processing component 702 and peripheral interface modules. The peripheral interface modules may be a keyboard, a click wheel, buttons, and the like. The buttons may include, but are not limited to, a home button, a volume button, a starting button, and a locking button.

The sensor component 714 includes one or more sensors to provide status assessments of various aspects of the apparatus 700. For instance, the sensor component 714 may detect an on/off status of the apparatus 700 and relative positioning of components, such as a display and small keyboard of the apparatus 700, and the sensor component 714 may further detect a change in a position of the apparatus 700 or a component of the apparatus 700, presence or absence of contact between the user and the apparatus 700, orientation or acceleration/deceleration of the apparatus 700 and a change in temperature of the apparatus 700. The sensor component 714 may include a proximity sensor, configured to detect the presence of nearby objects without any physical contact. The sensor component 714 may also include a light sensor, such as a Complementary Metal Oxide Semiconductor (CMOS) or Charge Coupled Device (CCD) image sensor, configured for use in an imaging application. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the apparatus 700 and other devices. The apparatus 700 may access a communication-standard-based wireless network, such as a Wireless Fidelity (WiFi) network, a 4th-Generation (4G) or 5th-Generation (5G) network or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the apparatus 700 may be implemented with one or more application specific integrated circuits (ASIC), digital signal processors (DSPs), digital signal processing devices (DSPDs), programmable logic devices (PLDs), field programmable gate arrays (FPGAs), controllers, micro-controllers, microprocessors, or other electronic components, for performing the above method for processing a video.

In an exemplary embodiment, a non-transitory computer-readable storage medium including an instruction, such as the memory 704 including the instruction, is further provided; and the instruction may be executed by the processor 720 of the apparatus 700 to complete the above method for processing a video. For example, the non-transitory computer-readable storage medium may be a read only memory (ROM), a random access memory (RAM), a compact disc read-only memory (CD-ROM), a magnetic tape, a floppy disc, an optical data storage device and the like.

In another exemplary embodiment, a computer program product is further provided. The computer program product includes a computer program capable of being executed by a programmable apparatus; and the computer program is provided with a code portion configured to be executed by the programmable apparatus to implement the above method for processing a video.

Other embodiments of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for processing a video, applied to a terminal device, the method comprising:
   identifying a target object in a first video segment;
   acquiring a current video frame of a second video segment;
   acquiring a first image region corresponding to the target object in a first target video frame of the first video segment, and acquiring a second image region corresponding to the target object in the current video frame of the second video segment, wherein the first target video frame corresponds to the current video frame of the second video segment in terms of video frame time;
   performing picture splicing on the first target video frame and the current video frame of the second video segment according to the first image region and the second image region to obtain a processed first video frame,
   wherein, before acquiring the current video frame of the second video segment, the method further comprises:
   acquiring, in real time, a video stream captured by an image capturing apparatus;
   for a current video frame of the video stream, acquiring a third image region corresponding to the target object in a second target video frame, wherein the second target video frame is a video frame in the first video segment that is acquired, and corresponds to the current video frame of the video stream in terms of video frame time;
   adding the third image region to the current video frame of the video stream to obtain a processed second video frame; and
   displaying the second video frame in a video preview interface, wherein the second video frame comprises the target object included in the third image region, and a target object in the current video frame of the video stream that is acquired in real time.

2. The method of claim 1, wherein performing the picture splicing on the first target video frame and the current video frame of the second video segment according to the first image region and the second image region to obtain the processed first video frame comprises:
   determining an image splicing boundary according to the first image region and the second image region;
   according to the image splicing boundary, acquiring a first local image including the first image region from the first target video frame, and acquiring a second local image including the second image region from the current video frame of the second video segment; and
   splicing the first local image and the second local image into the first video frame.

3. The method of claim 1, before performing the picture splicing on the first target video frame and the current video frame of the second video segment according to the first image region and the second image region, further comprising:
   determining a target frame in the first video segment as a reference frame; and
   performing one of:
   performing picture alignment processing on the first target video frame and the reference frame; or
   performing the picture alignment processing on the current video frame of the second video segment and the reference frame.

4. The method of claim 3, wherein the picture alignment processing comprises:
   acquiring, from among background feature points of the reference frame and of a specified video frame, target background feature points each having a same background feature in the reference frame and in the specified video frame, the specified video frame being one of the first target video frame or the current video frame of the second video segment; and aligning the specified video frame to the reference frame according to the target background feature points.

5. The method of claim 1, wherein adding the third image region to the current video frame of the video stream comprises:

determining an added position where the third image region is added in the current video frame of the video stream according to a position where the third image region is located in the second target video frame; and adding the third image region to the added position in the current video frame of the video stream.

6. The method of claim 5, wherein determining the added position where the third image region is added in the current video frame of the video stream according to the position where the third image region is located in the second target video frame comprises:

acquiring first background feature points within a preset proximity range of the third image region from among background feature points of the second target video frame;

determining second background feature points each having a same background feature with a respective one of the first background feature points from among background feature points of the current video frame of the video stream; and determining the added position according to positions where the second background feature points are located in the current video frame of the video stream.

7. The method of claim 1, before performing the picture splicing on the first target video frame and the current video frame of the second video segment according to the first image region and the second image region, further comprising:

performing duration alignment processing on the first video segment and the second video segment in a case where the first video segment is different from the second video segment in duration.

8. The method of claim 7, wherein the duration alignment processing comprises one of:

with a video segment having a shorter duration among the first and second video segments as a reference, deleting a part of video frames in a video segment having a longer duration among the first and second video segments, such that the first video segment is the same as the second video segment in duration; or according to existing video frames in the video segment having the shorter duration among the first and second video segments, increasing video frames to the video segment having the shorter duration, such that the first video segment is the same as the second video segment in duration.

9. The method of claim 1, further comprising:
generating a target video segment based on the first video segment; and displaying the target video segment in a video preview interface.

10. An apparatus for processing a video, comprising:
a processor; and
a memory configured to store instructions executable by the processor,
wherein the processor is configured to:
identify a target object in a first video segment;
acquire a current video frame of a second video segment;

acquire a first image region corresponding to the target object in a first target video frame of the first video segment, and acquire a second image region corresponding to the target object in the current video frame of the second video segment, wherein the first target video frame corresponds to the current video frame of the second video segment in terms of video frame time;

perform picture splicing on the first target video frame and the current video frame of the second video segment according to the first image region and the second image region to obtain a processed first video frame, wherein, before acquiring the current video frame of the second video segment, the processor is further configured to:

acquire, in real time, a video stream captured by an image capturing apparatus;

for a current video frame of the video stream, acquire a third image region corresponding to the target object in a second target video frame, wherein the second target video frame is a video frame in the first video segment that is acquired, and corresponds to the current video frame of the video stream in terms of video frame time;

add the third image region to the current video frame of the video stream to obtain a processed second video frame; and display the second video frame in a video preview interface, wherein the second video frame comprises the target object included in the third image region, and a target object in the current video frame of the video stream that is acquired in real time.

11. The apparatus of claim 10, wherein in performing the picture splicing on the first target video frame and the current video frame of the second video segment according to the first image region and the second image region to obtain the processed first video frame, the processor is further configured to:

determine an image splicing boundary according to the first image region and the second image region;

according to the image splicing boundary, acquire a first local image including the first image region from the first target video frame, and acquire a second local image including the second image region from the current video frame of the second video segment; and splice the first local image and the second local image into the first video frame.

12. The apparatus of claim 10, wherein before performing the picture splicing on the first target video frame and the current video frame of the second video segment according to the first image region and the second image region, the processor is further configured to:

determine a target frame in the first video segment as a reference frame; and perform one of:

performing picture alignment processing on the first target video frame and the reference frame; or performing the picture alignment processing on the current video frame of the second video segment and the reference frame.

13. The apparatus of claim 12, wherein the picture alignment processing comprises:

acquiring, from among background feature points of the reference frame and of a specified video frame, target background feature points each having a same background feature in the reference frame and in the specified video frame, the specified video frame being one of the first target video frame or the current video frame of the second video segment; and aligning the specified video frame to the reference frame according to the target background feature points.

14. The apparatus of claim 10, wherein in adding the third image region to the current video frame of the video stream, the processor is further configured to:
   determine an added position where the third image region is added in the current video frame of the video stream according to a position where the third image region is located in the second target video frame; and
   add the third image region to the added position in the current video frame of the video stream.

15. The apparatus of claim 14, wherein in determining the added position where the third image region is added in the current video frame of the video stream according to the position where the third image region is located in the second target video frame, the processor is further configured to:
   acquire first background feature points within a preset proximity range of the third image region from among background feature points of the second target video frame;
   determine second background feature points each having a same background feature with a respective one of the first background feature points from among background feature points of the current video frame of the video stream; and
   determine the added position according to positions where the second background feature points are located in the current video frame of the video stream.

16. The apparatus of claim 10, wherein before performing the picture splicing on the first target video frame and the current video frame of the second video segment according to the first image region and the second image region, the processor is further configured to:
   perform duration alignment processing on the first video segment and the second video segment in a case where the first video segment is different from the second video segment in duration.

17. The apparatus of claim 16, wherein the duration alignment processing comprises one of:
   with a video segment having a shorter duration among the first and second video segments as a reference, deleting a part of video frames in a video segment having a longer duration among the first and second video segments, such that the first video segment is the same as the second video segment in duration; or
   according to existing video frames in the video segment having the shorter duration among the first and second video segments, increasing video frames to the video segment having the shorter duration, such that the first video segment is the same as the second video segment in duration.

18. A non-transitory computer-readable storage medium having stored thereon instructions that, when executed by a processor of a device, cause the device to perform a method for processing a video, the method comprising:
   identifying a target object in a first video segment;
   acquiring a current video frame of a second video segment;
   acquiring a first image region corresponding to the target object in a first target video frame of the first video segment, and acquiring a second image region corresponding to the target object in the current video frame of the second video segment, wherein the first target video frame corresponds to the current video frame of the second video segment in terms of video frame time;
   performing picture splicing on the first target video frame and the current video frame of the second video segment according to the first image region and the second image region to obtain a processed first video frame,
   wherein, before acquiring the current video frame of the second video segment, the method further comprises:
   acquiring, in real time, a video stream captured by an image capturing apparatus;
   for a current video frame of the video stream, acquiring a third image region corresponding to the target object in a second target video frame, wherein the second target video frame is a video frame in the first video segment that is acquired, and corresponds to the current video frame of the video stream in terms of video frame time;
   adding the third image region to the current video frame of the video stream to obtain a processed second video frame; and
   displaying the second video frame in a video preview interface, wherein the second video frame comprises: the target object included in the third image region, and a target object in the current video frame of the video stream that is acquired in real time.

* * * * *